United States Patent [19]

Kuwabara et al.

[11] Patent Number: 5,032,159
[45] Date of Patent: Jul. 16, 1991

[54] METHOD OF MANUFACTURING OPTICAL DEVICE

[75] Inventors: Tetsuo Kuwabara, Urawa; Kiyoshi Yamamoto, Yokohama; Masaaki Yokota, Sagamihara, all of Japan

[73] Assignee: Canon Kabushiki Kaisha, Tokyo, Japan

[21] Appl. No.: 446,779

[22] Filed: Dec. 6, 1989

[30] Foreign Application Priority Data

Dec. 8, 1988 [JP] Japan .................. 63-308758
Nov. 8, 1989 [JP] Japan .................. 1-291907

[51] Int. Cl.⁵ .................. C03B 23/00
[52] U.S. Cl. .................. 65/64; 65/32.1; 65/32.5; 65/102; 65/374.13
[58] Field of Search .................. 65/64, 32.1, 32.5, 102, 65/105, 245, 268, 374.13

[56] References Cited

U.S. PATENT DOCUMENTS

| | | | |
|---|---|---|---|
| 3,829,301 | 8/1974 | Russell | 65/32.5 X |
| 3,833,347 | 9/1974 | Angle et al. | 65/32 |
| 3,900,322 | 8/1975 | Parsons et al. | 106/395 |
| 3,970,442 | 7/1976 | Gulotta | 65/32.5 |
| 4,139,677 | 2/1979 | Blair et al. | 65/32.5 X |
| 4,481,023 | 11/1989 | Matched et al. | 65/64 |
| 4,756,737 | 7/1988 | Yashimuya et al. | 65/275 |
| 4,778,505 | 10/1988 | Hirota et al. | 65/102 |

Primary Examiner—Robert L. Lindsay
Attorney, Agent, or Firm—Fitzpatrick, Cella, Harper & Scinto

[57] ABSTRACT

In a method of molding an optical device by press-molding a glass preform by using molding dies, the press-molding process is executed under a mixed gas atmosphere of a nonoxidizer gas and a hydrocarbon gas.

12 Claims, 9 Drawing Sheets

METHOD OF MANUFACTURING OPTICAL DEVICE

BACKGROUND OF THE INVENTION

1. Field of the Invention

The present invention relates to an optical device molding method whereby an optical device made of a glass such as lens, prism, or the like is manufactured by press-molding a glass preform.

2. Related Background Art

A technique for manufacturing a lens by press-molding a glass preform without needing the grinding process eliminates complicated processes which are needed in the conventional manufacturing method of a lens and can easily cheaply manufacture the lens. In recent years, such a technique has been used to manufacture not only a lens but also a prism and other optical devices made of glass.

(1) Hardness can be mentioned as a property which is required of a die material which is used to press-mold such optical devices made of glass or the like. Hitherto, as such kinds of die materials, many materials such as metal, ceramics, material on which metal or ceramics are coated, and the like have been proposed. For instance, a 13 Cr martensite steel has been proposed in JP-A-49-51112, and SiC and $Si_3N_4$ have been proposed in JP-A-52-45613.

(2) In an Official Gazette of an apparatus for molding glass in JP-U-42-8123 (based on the priority on Dec. 28, 1961; U.S. patent Ser. No. 162743, Applicant is General Precision Inc.), the following apparatuses have been disclosed.

A glass substance molding apparatus comprising a combination of: a sealed chamber having an inert atmosphere; a metal die which is disposed in the sealed chamber and has a cavity in the die; a glass substance put in the cavity; and an apparatus for heating the glass substance to flow the glass and to fill in the cavity.

An apparatus according to the above, wherein the metal of the die has a expansion coefficient lower than an expansion coefficient of glass.

An apparatus for molding a glass substance comprising a combination of: a sealed chamber having an inert atmosphere; a die of a metal portion which is supported by this chamber and has a cavity in the die; a plunger for applying a continuous pressure when one end is put into the cavity which is slidably attached onto the die connected to the cavity; and a heating apparatus for heating glass in the cavity.

An apparatus according to the former apparatus, wherein the heating apparatus includes a heat sink apparatus which is arranged on the outside of the sealed chamber and heats the glass by the induction and surrounds the metal die.

(3) In the specifications of U.S. Pat. Nos. 833347 and 3900328 (JP-B-54-38126), there is disclosed a manufacturing method in which a glass-like carbon die is disposed in a proper chamber and which comprises the steps of: (a) inserting a glass block into a cavity of the die; (b) evacuating the chamber; (c) degassing the die assembly at a relatively low temperature; (d) controlling an atmosphere so as to nonoxidize the chamber; (e) thermally softening the glass block by raising the temperature of the die; (f) applying a pressure to the die; (g) setting the temperature of the glass to a temperature which is equal to or lower than a glass transformation point by cooling the die; (h) eliminating the pressure from the die; (i) further reducing the temperature of the die; and (j) taking out the finished lens.

According to the glass press-molding method, a glass preform which was heated at a high temperature is inserted into the die which was heated at a high temperature and is press-molded and, thereafter, it is cooled and an optical device is manufactured. Therefore, a thermal fatigue or the oxidation of the die occurs due to a thermal shock thereof, which makes the life of the die short. The molding surface of the die must be cleaned. Since, a mist of the glass surface occurs due to the reaction of the glass and the die material.

As a countermeasure for the above problems, there has been proposed JP-A-61-31321 in which the molding surface of the press-molding die is formed with ceramics or JP-B-61-32263 (U.S. Pat. No. 4481023) in which the surface of the die is formed with tungsten carbide, an alloy of noble metal, or the like.

On the other hand, as a countermeasure to improve the separating efficiency between the glass and the die which were heated at high temperatures, there has been proposed JP-A-61-197430, which discloses:

a die for molding an optical glass device in which a molding surface of a predetermined shape is formed on the die to press-mold a desired molding object, characterized in that a coating film consisting of AlN is formed on the molding surface;

an optical glass device molding die which is formed by a metal material of either one of an Ni base alloy, an Fe base heat resistance alloy, and a WC—Co system alloy; and an optical glass device molding die which is formed by a ceramic material containing either AlN or $Si_3N_4$ as a main component.

However, 13 Cr martensite steel has drawbacks such that it is easily oxidized and Fe is diffused into the glass at a high temperature and the glass is colored. Although SiC and $Si_3N_4$ are generally considered as being hardly oxidized, they are also oxidized at a high temperature and an $SiO_2$ film is formed on the surface, so that adhesion with the glass occurs. Further, since their hardnesses are high, the working efficiency of the die itself is bad. When tungsten carbide is used as a material of the die and the glass preform is press-molded, a reaction occurs between the glass surface and the surface of the die due to the press-molding by the heating at a high temperature and a phenomenon such that the glass reactant is deposited onto the surface of the die when the molded glass is separated from the die occurs. The inventors of the present invention have found out that such a reaction phenomenon occurs in the following manner. The sintered hard alloy is formed by coupling tungsten carbide by using cobalt Co as a binder. When tungsten carbide and glass are heated at a high temperature and are press-molded, cobalt on the surface of the tungsten carbide and lead contained in the glass react as follows.

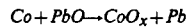
$Co + PbO \rightarrow CoO_x + Pb$

On the other hand, tungsten carbide WC and lead contained in the glass react as follows.

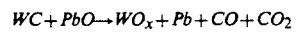
$WC + PbO \rightarrow WO_x + Pb + CO + CO_2$

Thus, lead in the glass is precipitated and causes a product between the die and the glass, so that a phenomenon such as a mist as mentioned above occurs when the glass is separated from the die. If the surface of the die is made of a ceramics material, a reaction between the ceramics and lead oxide in the glass hardly occurs. Therefore, a product due to the reaction as in the case of using tungsten carbide mentioned above is hardly produced. However, in place of it, the contact force between the surface of the die and the surface of the glass molded article increases. Since such a contact force is larger than the strength of the glass when it is separated from the die, the surface of the glass molded article is destroyed and a cracking phenomenon of the glass molded article is caused.

It is the first object of the invention to propose a manufacturing method in which even a high endurance material having a high adhesion tendency can be used as a material of the die.

Practically speaking, it is an object of the invention to propose an optical device manufacturing method in which a material which can reduce a reaction such that cobalt and tungsten carbide in a sintered hard alloy directly reduce lead oxide in the glass and which has a separation effect is interposed between the die surface and the glass surface, so that no adhesion occurs and the die surface hardly deteriorates.

Still another object of the invention is to propose a manufacturing method in which a very small amount of material which actively reacts to lead in a glass is interposed between the die surface and the glass preform, thereby blocking a direct reaction between the die and the glass preform.

In the above invention, the inventors of the invention propose a manufacturing method in which when a die and a glass preform are heated at a high temperature and are press-molded, an atmosphere in which the press-molding is executed is filled with a gas containing hydrocarbon (practically speaking, a mixture gas of a nonoxidizer gas and a hydrocarbon gas) and a reaction such as

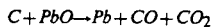

$$C + PbO \rightarrow Pb + CO + CO_2$$

is caused between carbon in the gas and lead in the glass, thereby blocking a reaction between the die and the glass.

The inventors of the invention also propose an application example in the case of using a preferable atmosphere. For instance, in the case of using a process to fill the whole molding steps by an inert gas such as a nitrogen gas or the like which is suitable for solving various problems such as thermal stress due to high temperature and high heat of a mechanism which is necessary for the operations in the steps which are needed for a molding apparatus, particularly, for a glass press-molding included in the molding apparatus. For instance, the steps such as conveyance, insertion, heating, and cooling of a die and a glass preform, fetching of a molded article, and the like, fatigue due to the repetition of the heating and cooling cycles, and the like.

Further, the inventors of the invention propose a manufacturing method in which a ceramics sintered material as a die material which does not cause any reactant with lead in a glass is used and a gas containing carbon is interposed between the die made of the ceramics sintered material and a glass preform, thereby causing a reaction between carbon in the gas and lead in the glass, so that it is possible to avoid the cracking phenomenon of the glass molded article which is caused by an increase in contact force due to the ceramics die.

BRIEF DESCRIPTION OF THE DRAWINGS

FIG. 7 is a plan view of the whole apparatus;

FIGS. 8 to 12 are schematic cross sectional views of a pallet in each step; and

DETAILED DESCRIPTION OF THE PREFERRED EMBODIMENTS

Figure 1A:
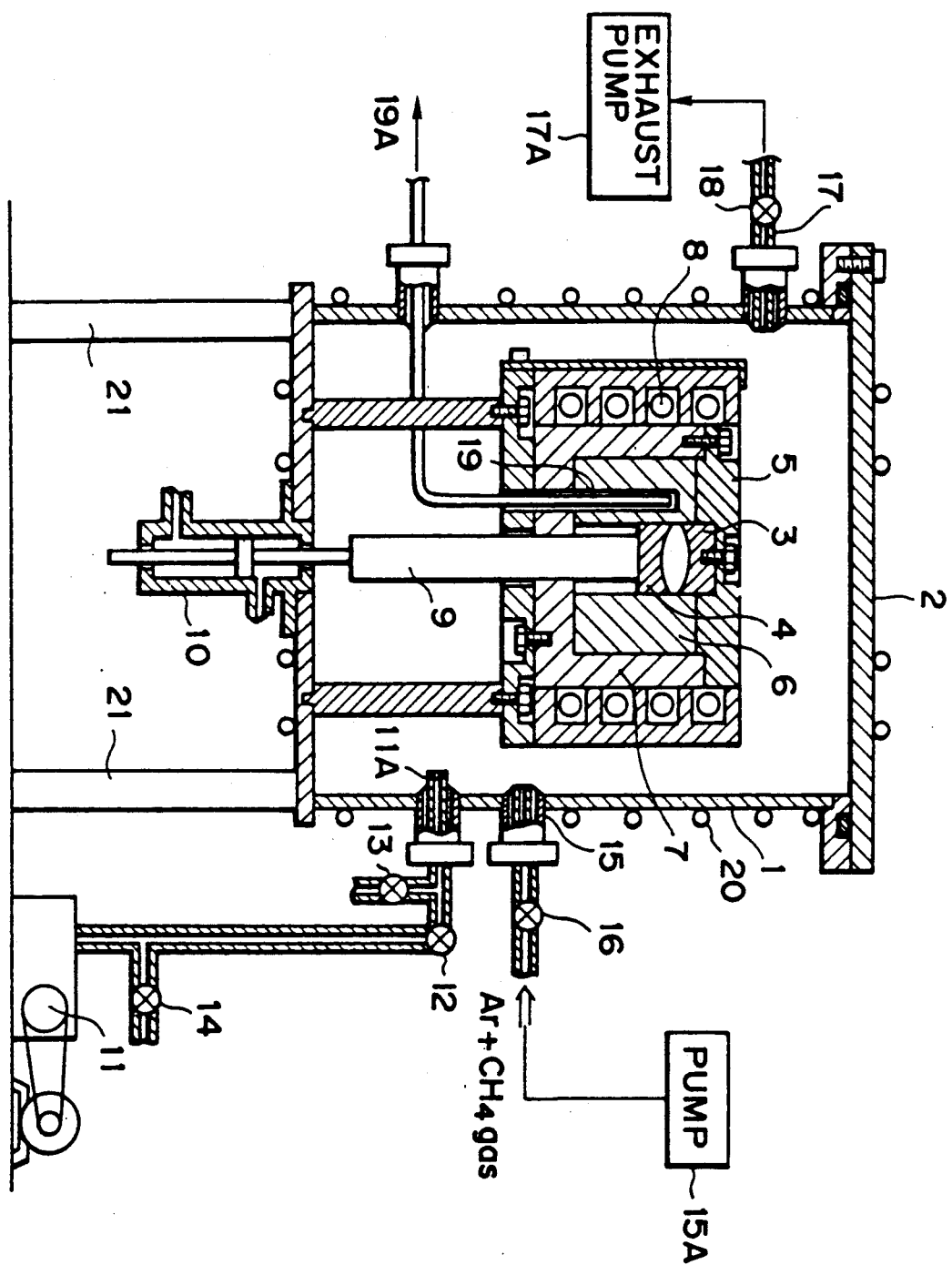
FIG. 1A is a cross sectional view of a molding apparatus which is used in an optical device molding method of the invention.

The invention will be practically described with respect to embodiments.

Embodiment 1

(1-1) FIG. 1 shows an example of a molding apparatus which is used in a molding method of the invention.

In FIG. 1, reference numeral 1 denotes a vacuum chamber main body; 2 a cover of the vacuum chamber; 3 an upper die to mold an optical device; 4 a lower die; 5 an upper die holding member to fix the upper die 3 by screws shown in the diagram; and 6 a cylindrical drum die. The upper die 3 is fitted and held into an internal hollow portion and the lower die 4 is slidably fitted therein. The drum die 6 is enclosed in a die holder 7. The upper die holding member 5 is coupled and fixed to the die holder 7 by the screws. Reference numeral 8 denotes a heater to heat the upper die 3, lower die 4, and drum die 6. The heater 8 is wound and held around the outer periphery of the die holder 7 and is connected to a heater electric source 8A. The heating operation of the heater 8 is controlled by a controller 1A. Reference numeral 9 denotes a rod member to press the lower die 4. An upper edge of the rod member 9 is coupled with the lower die 4 and penetrates the hollow portion of the drum die 6, a through hole of the bottom portion of the die holder 7, and a through hole of a holding plate 7A of the die holder 7, respectively. A lower edge of the rod member 9 is coupled with a piston of an air cylinder 10 and executes the ascending or descending operation in accordance with the operation of the air cylinder 10.

Reference numeral 11 denotes an oil rotary pump which is connected to a coupling hole of the vacuum chamber main body 1 by a connecting pipe; 12, 13, and 14 indicate pressure adjusting valves; 15 a pipe to inflow a mixture gas of $Ar + CH_4$; and 16 a valve. The mixture gas is supplied from a gas supply source 15A. Reference numeral 17 indicates a leakage pipe to exhaust the mixture gas; 18 indicates a valve; and 17A an exhaust pump.

Reference numeral 19 denotes a temperature sensor. The sensor 19 is inserted into a measurement hole formed in the drum die 6 in order to measure a heating or cooling temperature of a glass molded article (not shown) which was put into a cavity formed by the upper die 3 and the lower die 4. An output of the temperature sensor 19 is used as a drive signal 19A of the heater 8 to obtain a temperature curve shown in FIG. 2.

Figure 2:
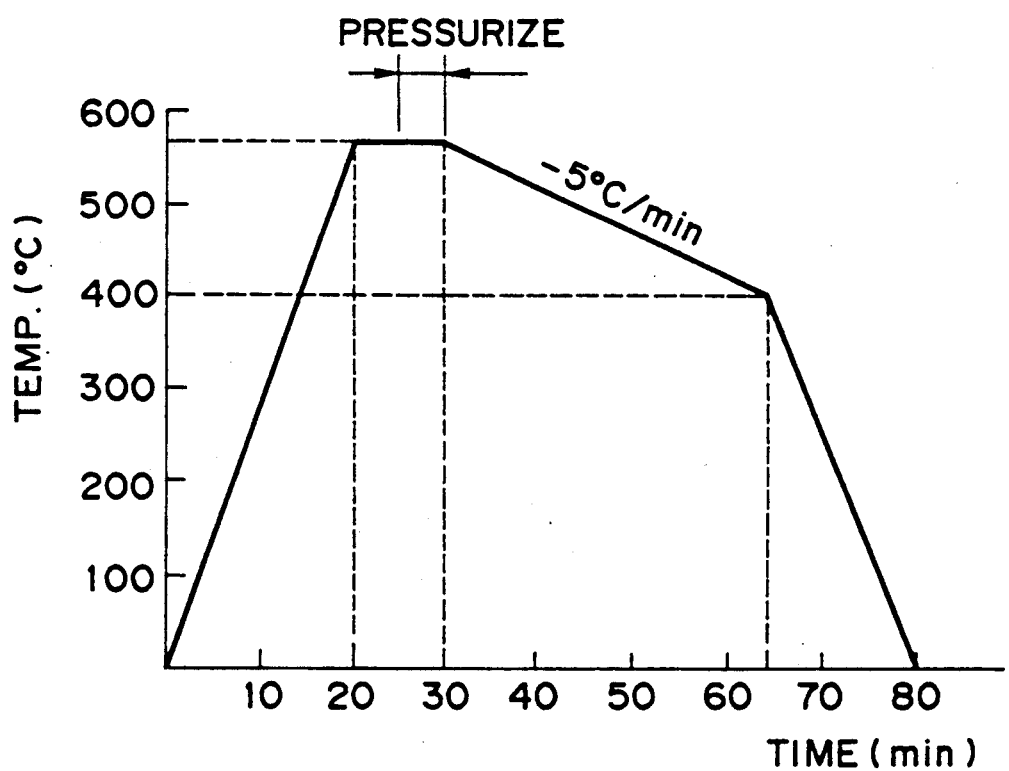
FIG. 2 is a diagram showing the relation between the time and the temperature when molding a lens.

Reference numeral 20 indicates a water-cooled pipe to control the temperature in accordance with the molding temperature curve in FIG. 2.

Reference numeral 21 denotes supporting members.

Figure 1B:
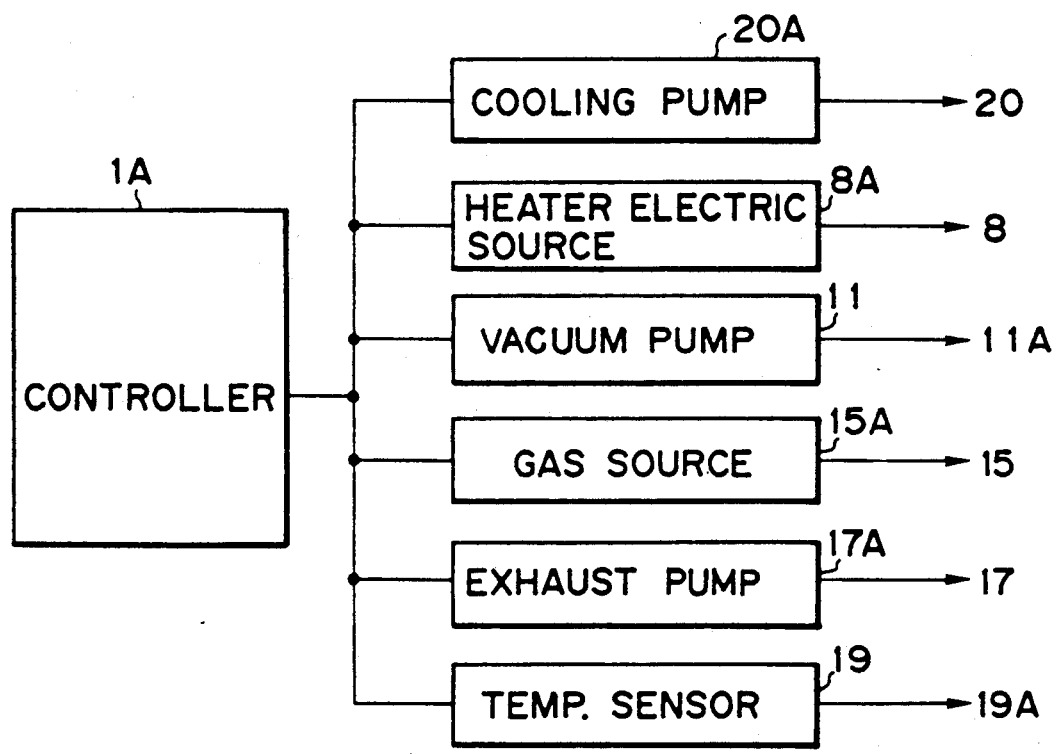
FIG. 1B is an explanatory diagram of a block construction.

FIG. 1B shows a block diagram to make each means in FIG. 1A operative. Operations, which will be explained hereinlater, are executed on the basis of signals from the controller 1A.

(1-2) With respect to the mixture gas:

As a nonoxidizer gas, for instance, an inert gas such as Ne, Ar, or the like or an $N_2$ gas can be mentioned. For example, $CH_4$, $C_2H_6$, or $C_3H_8$ can be mentioned as a hydrocarbon gas. On the other hand, it is preferable to set a concentration of the hydrocarbon gas in the mixture gas to a value within a range from 0.5 to 4 weight %. If the concentration of the hydrocarbon gas is less than 0.5 weight %, there is a tendency such that an adhesion due to an increase in contact force between the glass and the molding die is more likely to occur. If the concentration of the hydrocarbon gas exceeds 4 weight %, there is a tendency such that cracks which are considered to be caused due to a decrease in strength of the glass is more likely to occur.

(1-3) With respect to the upper die, lower die, and drum die:

As mentioned in the paragraphs stating the objects of the invention, examination has been made with respect to the die material which does not cause the reaction between lead contained in the glass and the component of the die material. As characteristics which are required for a die material, it is desirable to use a material which is excellent in oxidation resistance and which can maintain a high hardness at a high temperature in consideration of the high temperature molding of the glass. As such a material, nitride, carbide, silicide, oxide, etc. can be mentioned. On the other hand, a lens for a camera can be mentioned as a typical example of an optical device as a molding object which is manufactured by the present invention. Among the camera lenses, in particular, an aspherical lens is suitable.

This is because in the optical system of the camera lens, particularly, the zoom lens, if the aspherical lens is assembled in the optical system, the number of lenses of the optical system can be reduced and it can largely contribute to the miniaturization and the realization of light weight of a lens mirror barrel.

The molding surface of the die to mold the aspherical lens obviously has an aspherical shape. It is difficult to work such an aspherical shape of the die. The inventors have examined a sintered material of tungsten carbide and a ceramics sintering material ($Si_3N_4$, SiC, etc.) and the cerment of TiC and metal as a material of the die.

Further, a film material was coated onto the die, particularly, the upper and lower dies. As a film material, nitride (BN, AlN, $Si_3N_4$, TiN, TaN, ZrNe, etc.), carbide (SiC, TaC, HfC, etc.), oxide ($Cr_2O_3$, $Al_2O_3$, etc.), or the like can be mentioned.

(1-4) Steps of manufacturing a lens will now be described.

Tungsten carbide is selected as a die material. The upper die, lower die, and drum die are worked into predetermined shapes. The lens molding surface is ground to a mirror surface with the accuracy such that the surface roughness is set to about 0.01 μm. Next, an SiC film is coated onto the lens molding surfaces of the upper and lower dies by a sputtering process. A film thickness is set to 1.0 μm. Then, the die prepared as mentioned above is attached to the apparatus of FIG. 1A. A flint system optical glass (SF 14) is adjusted to a predetermined amount. A spherical glass preform is put in the cavity of the die and it is set in the apparatus.

After the die into which the glass preform had been put was set into the apparatus, the cover 2 of the vacuum chamber 1 is closed. A water is fed into the water-cooled pipe 20. A current is supplied to the heater 8. At this time, the valves 16 and 18 for the mixture gas of $Ar+CH_4$ are closed and the valves 12, 13, and 14 of the exhaust system are also closed. The oil rotary pump 11 is always rotating.

In order to fill the atmosphere of the mixture gas of $Ar+CH_4$ into the whole molding chamber, the valve 12 is opened and the evacuation is started. When a degree of vacuum in the molding chamber becomes $10^{-2}$. Torr or less, the valve 12 is closed and the valve 16 is opened to introduce the gas {$Ar+CH_4$ of 1% (weight %; the same shall also apply hereinafter)} into the vacuum chamber from a gas bomb. When the temperature becomes a predetermined value, the air cylinder 10 is made operative, thereby pressurizing at a pressure of 100 kg/cm² for five minutes. After the pressure was eliminated, the cooling process is executed at a speed of $-5°$ C./min until the temperature of the transition point or less. Thereafter, the cooling process is executed at a speed of $-20°$ C./min or higher. When the temperature decreases to 200° C. or less, the valve 16 is closed and the leak valve 13 is opened, thereby introducing the air into the vacuum chamber 1. Then, the cover 2 is opened and the upper die weight is removed and a molded article is taken out.

As mentioned above, a lens was molded by using the flint system optical glass SF 14 (softening point $S_p=586°$ C., transition point $T_g=485°$ C.). FIG. 2 is a diagram showing the molding conditions at this time, that is, the time-temperature relation.

In the molding processes which were executed as mentioned above, no adhesion occurs between the die and the glass and a good molding surface was obtained.

Namely, in the embodiment, carbon in the mixture gas of $Ar+CH_4$ as an atmosphere gas in the molding chamber reacts to lead in the glass as follows.

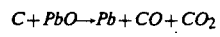

$$C+PbO \rightarrow Pb+CO+CO_2$$

Thus, the adhesion between the die and the glass can be prevented.

On the other hand, a lens was molded by using the glass preform SF 14 in a manner similar to the above except that the $(Ar+4\% CH_4)$ gas or the $(Ar+5\% CH_4)$ gas was used as a molding atmosphere. In the case of the $(Ar+4\% CH_4)$ gas, no adhesion occurs between the die and the glass and a good molding surface was obtained. In the case of the $(Ar+5\% CH_4)$ gas, a slight adhesion occurred.

The contact forces between the glass and the die in the above molding atmosphere were measured. The transmittances of the lenses obtained as mentioned above were measured.

(1-5) <Measurement of the contact forces>

Figure 3:
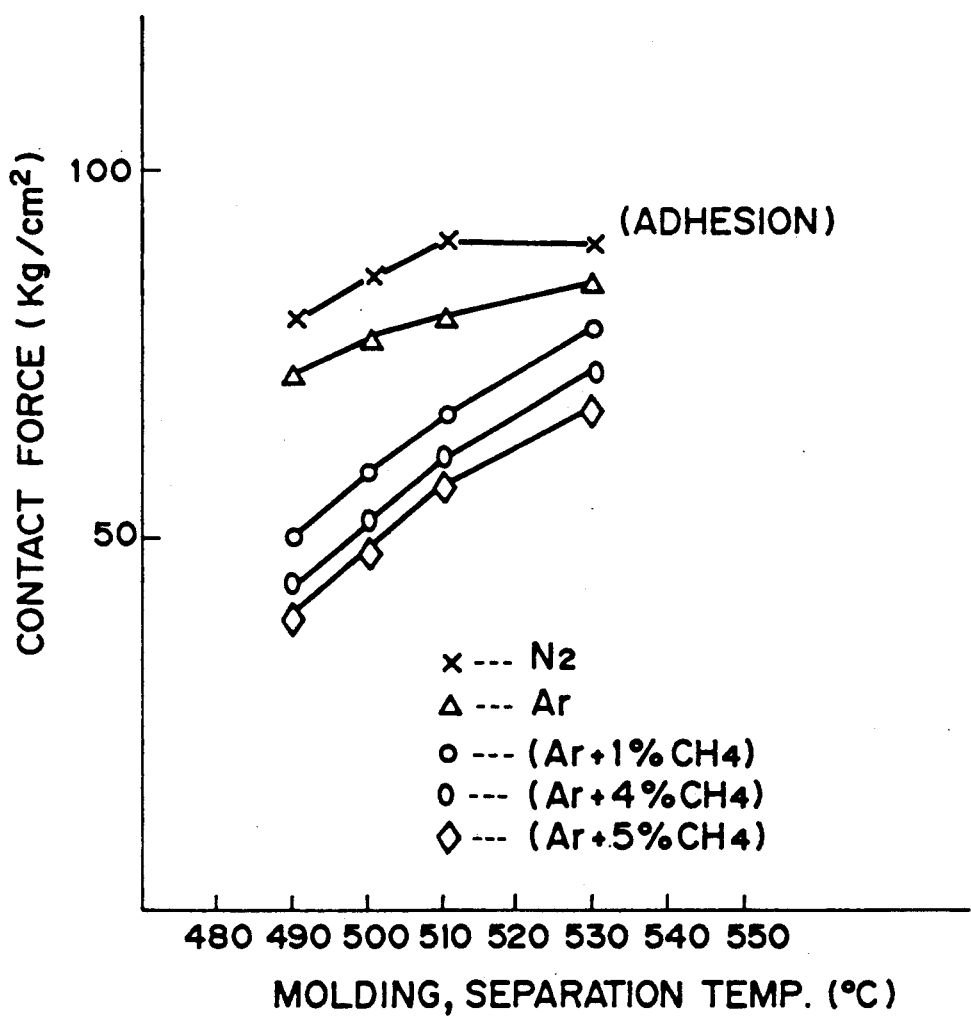
FIG. 3 is a diagram showing the relations among the contact force and the molding/separation temperatures of the glass and die.

The contact forces in the atmospheres of (Ar+CH$_4$ 1%), (Ar+CH$_4$ 4%), and (Ar+CH$_4$ 5%) and in the atmospheres of N$_2$ and A$_r$ for comparison were measured. FIG. 3 shows the results.

As will be obviously understood from FIG. 3, the contact force between the glass and the die in the mixture gas of the nonoxidizer gas Ar and the hydrocarbon gas CH$_4$ is smaller as compared with those in the N$_2$ gas and the Ar gas. Therefore, in the (Ar+CH$_4$) gas atmosphere, the excellent separating performance mentioned in the lens molding can be obtained. The reason why the contact force in the N$_2$ gas at 530° C. is smaller than that at 510° C. is because cracks of the glass occurred due to the adhesion. On the other hand, in the (Ar+CH$_4$) gas atmosphere, although the contact force decreases as the CH$_4$ concentration is high, there is also a case where cracks which are considered to be caused due to a decrease in strength of the glass occur at a concentration of 5% of CH$_4$. Therefore, a concentration range from 0.5% to 4% is preferable.

Figure 4:
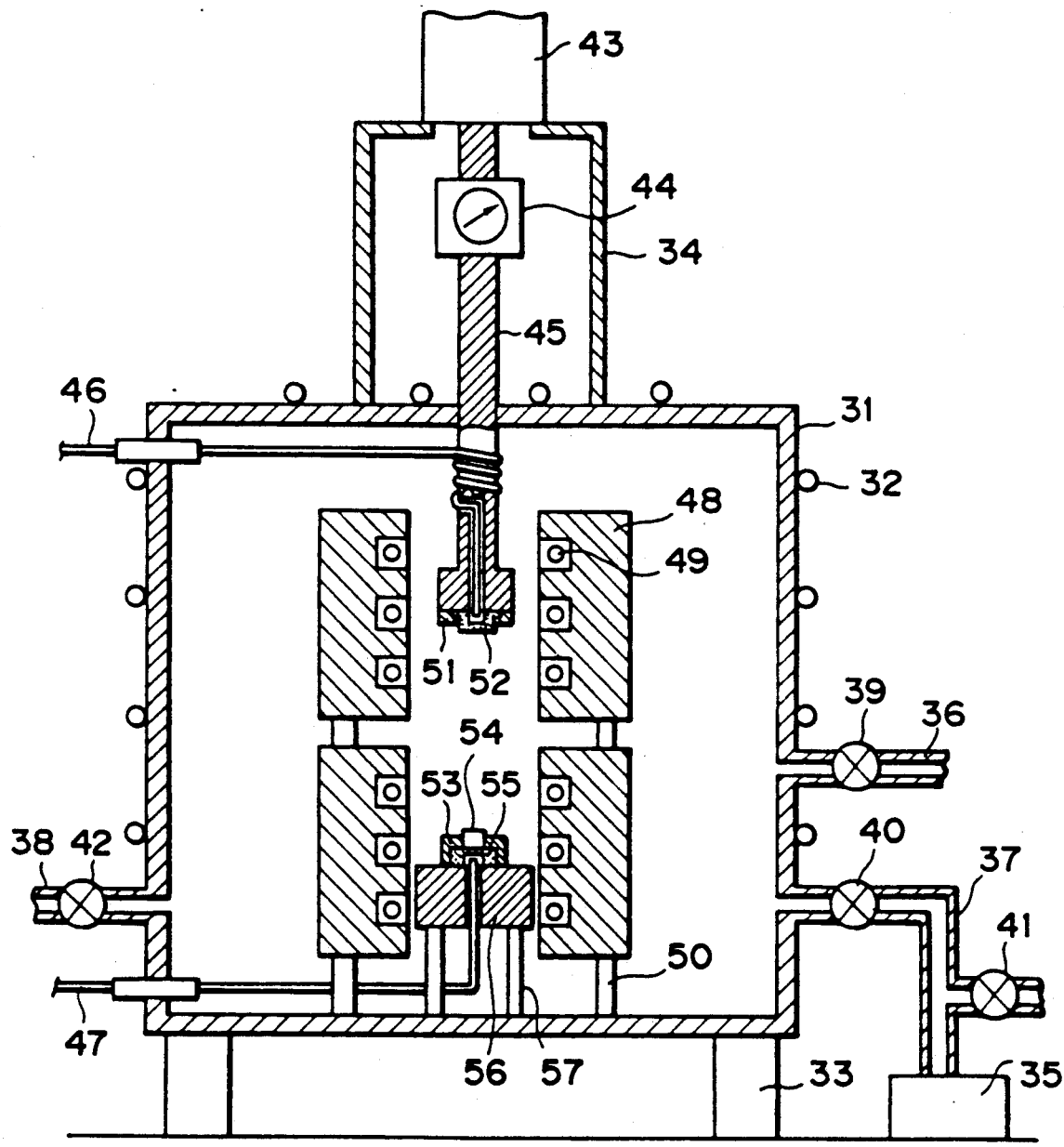
FIG. 4 shows an apparatus which is used to measure the contact force.

FIG. 4 shows an apparatus used to measure the contact forces.

In FIG. 4, reference numeral 31 denotes a vacuum chamber; 32 indicates a water-cooled pipe; 33 and 34 frame bases; 35 a vacuum pump; 36 a feed pump; 37 a vacuum exhaust pipe; 38 a leakage pipe; 39, 40, 41, and 42 valves; 43 an air cylinder; 44 a load cell; 45 a rod; 46 and 47 thermocouples; 48 a heat insulating material; 49 a heater; 50 a frame base; 51 an upper die holding ring; 52 an upper die of a sample material; 53 a drum die; 54 a glass preform; 55 a lower die; 56 a base holder; and 57 a frame base.

A procedure to measure the contact forces will now be described.

Figure 5:
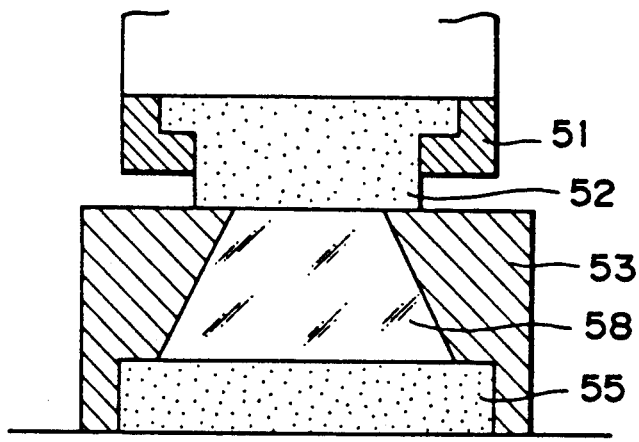
FIG. 5 is an enlarged diagram showing a state after completion of the pressurization upon measurement.

As shown in FIG. 4, the glass preform (SF 14) 54 of the flint system is put on the lower die 55. The upper die 52 of the sample material is attached to the lower surface of the rod 45 by the upper die holding ring 51. The vacuum pump 35 is always rotating. After the intake valve 39, leakage valve 42, and exhaust valves 40 and 41 were closed, the valve 40 is opened to start the evacuation in the vacuum chamber. When the pressure in the vacuum chamber becomes $10^{-2}$. Torr or less, the valve 40 is closed and the valve 36 is opened, thereby introducing the (Ar+1% CH$_4$) gas from the gas bomb into the vacuum chamber. Then, the water is supplied to the water-cooled pipe 32 and the current is supplied to the heater 49. When the temperatures of the upper and lower dies become 530° C., the air cylinder 43 is made operative to descend the rod 45, thereby pressurizing at a pressure of 100 kg/cm$^2$ for five minutes. FIG. 5 shows the state after completion of the pressurization. In FIG. 5, reference numeral 58 denotes a molded article. Next, the air cylinder is made operative and the pressure is eliminated. Thereafter, the rod is gradually ascended. At this time, the force which is required to separate the molded article 58 from the upper die is measured by the load cell 44.

(1-6) Measurement of the transmittances

Figure 6:
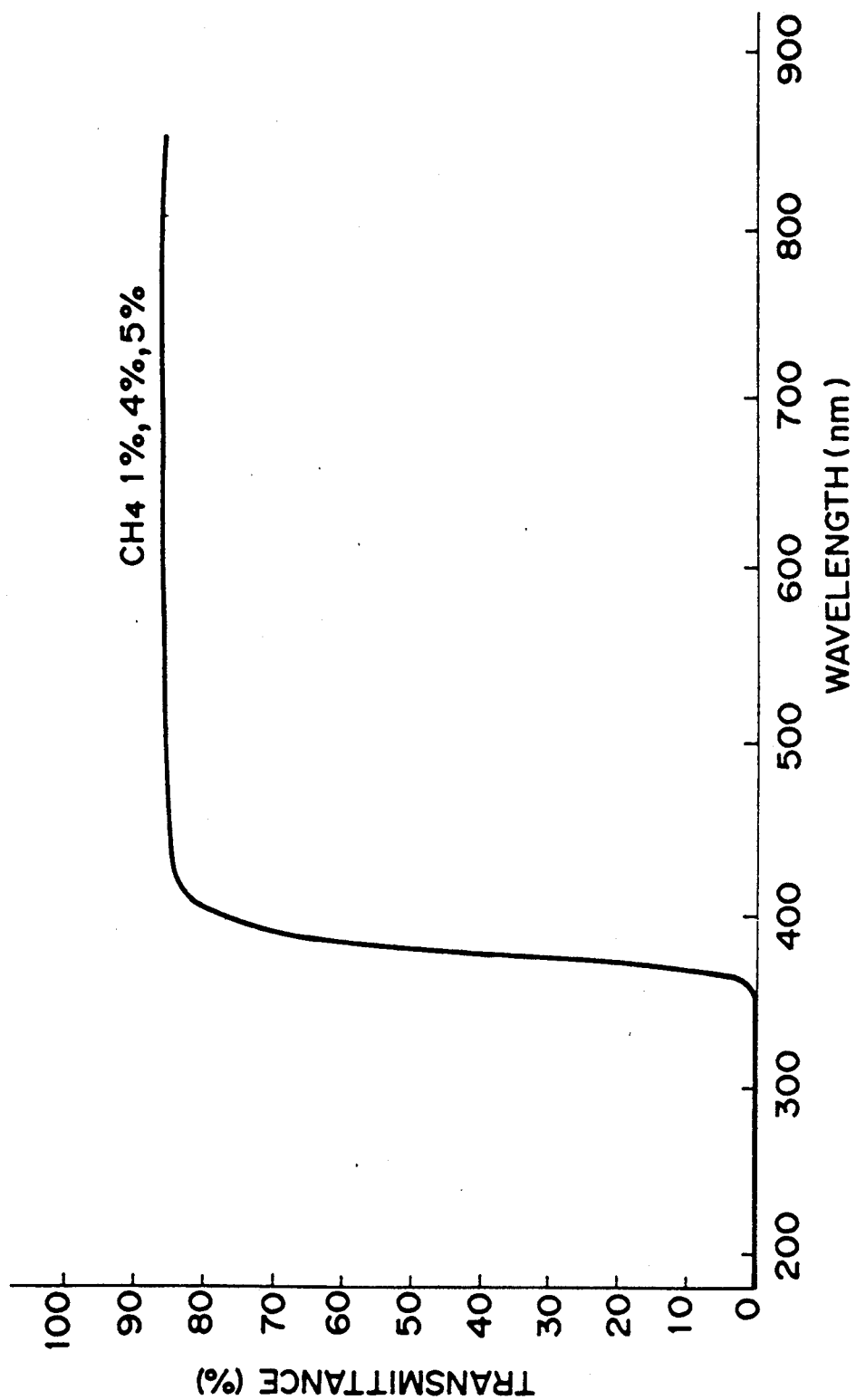
FIG. 6 is a graph showing the result of the measurement of a transmittance of a molded article.
Figure 7:
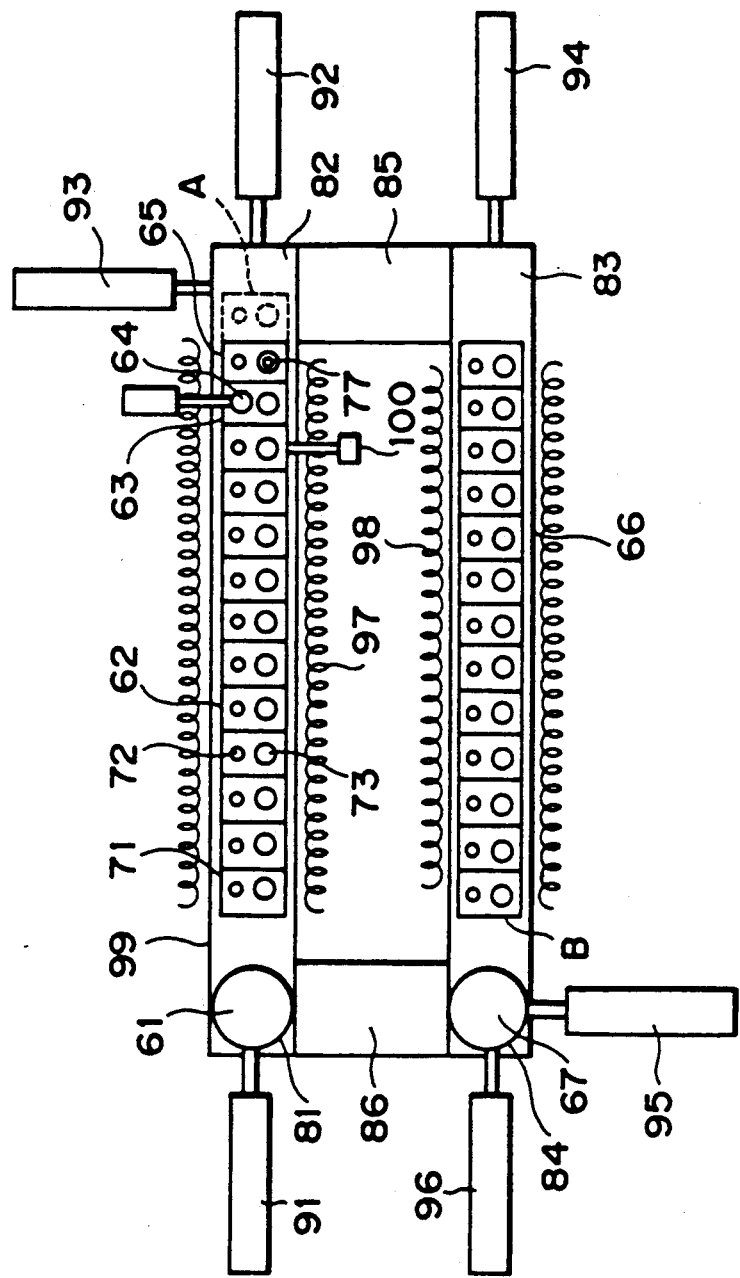
FIGS. 7 to 12 are cross sectional views of another molding apparatus which is used in the method of the invention.

The transmittances of three kinds of lenses obtained by the lens molding processes were measured by a self recording spectrophotometer (HITACHI Model 340). FIG. 6 shows the results. The transmittances on a d line (587.56 mm) are about 86% in any of the cases of the (Ar+1% CH$_4$) gas, (Ar+4% CH$_4$) gas, and (Ar+5% CH$_4$) gas and this value is the same as that of the glass preform SF 14. A deterioration by the molding was not caused. This means that the reduction of lead oxide in the glass hardly occurred upon molding.

Measurement conditions of the transmittances
feeding speed: 3 min/190-850 nm (wavelength range)
slit width: 2 nm
vertical magnification: 100%
measuring mode: UV-VIS (ultraviolet—visible)
sensor: photomultiplier (1-7) Modification The above first embodiment has been described with respect to the example in which the inside of the molding chamber shown in FIG. 1A is filled with the mixture gas of Ar+CH$_4$. However, the atmosphere in the molding chamber is filled with the inert gas such as a nitrogen gas or the like, the (Ar+CH$_4$) mixture gas is adhered onto the molding surfaces of the upper and lower dies or the surface of the glass preform, and the glass preform is molded under the above molding conditions. Thus, an effect to prevent the adhesion by the (Ar+CH$_4$) mixture gas could be obtained.

Embodiment 2

(2-1) FIGS. 7 to 12 are diagrams showing another apparatus which is used in the molding method of the invention.

A whole construction of the apparatus comprises: a preform intake chamber 61; a heating section 62; a preform transfer section 63; a pressing section 65; an annealing section 66; and a molded article fetching room 67. The preform intake chamber 61, heating section 62, preform transfer section 63, and pressing section 65 are arranged on the same line and the annealing section 66 is arranged in parallel with those lines.

A first transporting chamber 81 is constructed near the inlet of the heating section 62. The preform intake chamber 61 is provided in the first transporting chamber 81. A second transporting chamber 82 is constructed near the outlet of the pressing section 65. A third transporting chamber 83 is constructed at the inlet of the annealing section 66. The second and third transporting chambers are coupled by a transporting passage 85. On the other hand, a fourth transporting chamber 84 is constructed near the outlet of the annealing section 66. The moved molded article fetching room 67 is provided in the fourth transporting chamber 84. The fourth transporting chamber 84 and the first transporting chamber 81 are coupled by a return passage 86. With the above construction, the molding apparatus constructs a molding chamber 99 with a continuous circulating passage.

Reference numeral 71 denotes a pallet which is transported in the molding chamber 99. A preform holder 72 and an upper die 73 and a lower die 74 for press-molding are arranged on and over the pallet 71 at predetermined intervals. A guide member 87 is fixed to the outer periphery of the lower die 74 so as to be slightly projected from the upper end portion of the lower die 74 in order to guide the setting operation of the upper die 73 and to position the upper die 73. Mirror surfaces 73a and 74a to mold the optical device functional surface are formed on the press-molding surfaces of the upper die 73 and lower die 74, respectively.

The first transporting chamber 81 is provided with an extruding cylinder 91 as means for transporting the pallet 71 on the above passage. The pallet 71 is moved to the pressing section 65 by the extruding cylinder. An extruding cylinder 93 and a pull-out cylinder 92 are provided for the second transporting chamber 82. The pallet 71 which was moved to the pressing section 65 by the pull-out cylinder 92 is pulled out into the second transporting chamber 82. The pallet 71 which was moved to the second transporting chamber 82 by the extruding cylinder 93 is extruded into the third transporting chamber 83. An extruding cylinder 94 is provided for the third transporting chamber 83. The pallet 71 which was moved to the third transporting chamber 83 by the extruding cylinder 94 is extruded to the position just before the fourth transporting chamber 84. An extruding cylinder 95 and a pull-out cylinder 96 are provided for the fourth transporting chamber 84. The pallet 71 which was moved to the position just before the fourth transporting chamber 84 by the pull-out cylinder 96 is pulled out to the fourth transporting chamber 84. Next, the pallet 71 which was moved to the fourth transporting chamber 84 is again extruded to the first transporting chamber 81 by the extruding cylinder 95.

In this manner, the pallet 71 is transported to each step by the extruding or pull-out operation of the above cylinders and can move in the molding chamber 99 of the apparatus. The pallet 71 is disposed on a rail (not shown) provided in the molding chamber 99 and is moved on the rail by the extruding or pull-out operation of the cylinders.

(2-2) Each section in the molding chamber will now be described.

Figure 10:
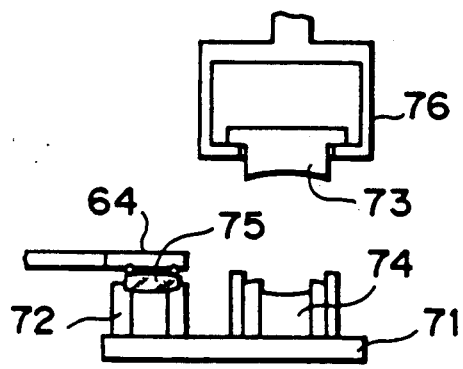

Lift-up hands 76 and 80 (FIG. 10) to lift up the upper die 73 at a desired distance away from the lower die 74 are provided for the preform transfer section 63 and molded article fetching chamber 67. The lift-up hands are vertically moved by lifting means (not shown). Further, an adsorbing finger 64 to transfer a preform 75 which was put onto the preform holder 72 to the lower die 74 in the preform intake chamber 61 is provided for the preform transfer section 63 (FIG. 10). After the upper die 73 was once lifted up by the operation of the lift-up hand 76, the adsorbing finger 64 is made operative and the preform 75 is transferred to a predetermined position on the lower die 74. The adsorbing finger 64 is constructed so as to operate with a predetermined stroke such that the adsorbing finger accurately moves in parallel by only the length of a predetermined interval between the preform holder 72 and the lower die 74 on and over the pallet 71 in a manner such that when the preform 75 is transferred, the preform 75 is accurately arranged at a predetermined position on the lower die 74.

On the other hand, an adsorbing finger 79 (FIG. 12) for setting the preform 75 onto the holder 72 for taking out a molded article 78 from the upper die 74 is provided in the preform intake chamber 61 and molded article fetching room 67.

Figure 11:
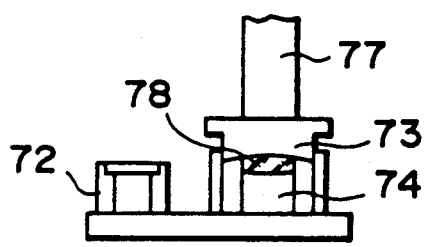
Figure 12:
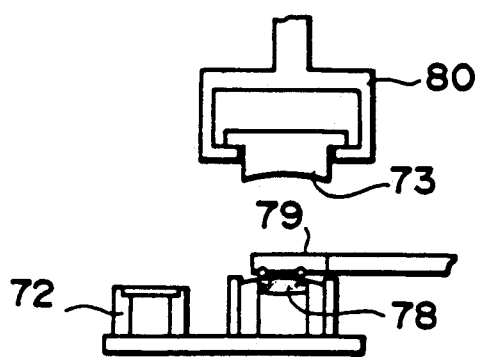

A pressing rod 77 to press the upper die 73 upon press-molding is provided for the pressing section 65 (FIG. 11).

In the apparatus, after completion of the vacuum evacuation, the inside of the molding chamber 99 needs to be filled with an atmosphere gas in order to prevent the die material to form the upper die 73 and lower die 74 are oxidized at a high temperature. Therefore, it is necessary to sufficiently shield the slide portions between the lift-up hand 76, adsorbing finger 64, pressing rod 77, etc. and the outer wall of the furnace body 99.

On the other hand, in the apparatus, although not shown, it is necessary to provide an atmosphere substituting room in order to prevent that the outside atmosphere entering the molding chamber 99 when the preform 75 is inserted into the preform intake chamber 61. To adjust the concentration of the atmosphere $CH_4$ gas, an infrared type gas analyzer 100 is provided for the molding chamber.

Figure 8:
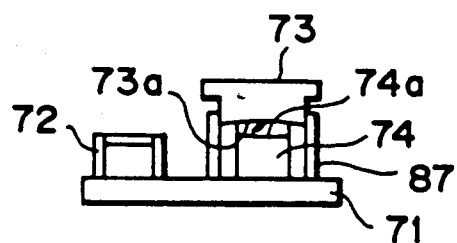

(2-3) With respect to the die material:

A ceramics sintered material consisting of $Si_3N_4$ was selected as materials of the upper die 73, lower die 74, and drum die guide member 87 shown in FIG. 8 in the embodiment.

In the embodiment, the glass preform 75 is put on the preform holder 72 on the pallet 71 and is heated until a predetermined temperature. Therefore, if the preform holder 72 is made of the ceramics sintered material to prevent the adhesion between the heated glass and the holder 72, good result is obtained.

(2-4) The operation of the apparatus constructed as mentioned above will now be described in accordance with the order of the press-molding steps shown in FIGS. 8 to 12. FIG. 8 shows the pallet 71 in a state in which the preform 75 is not arranged.

First, as mentioned above, in order to prevent the oxidation of the die materials of the upper and lower dies 73 and 74, the inside of the molding chamber 99 is vacuum evacuated until $1 \times 10^{-2}$ Torr by a vacuum pump (not shown). Thereafter, the molding chamber 99 is filled with the $(Ar+1\% CH_4)$ gas. The concentration of the $CH_4$ gas is controlled to a value within an allowable value by using the infrared type gas analyzer 100.

Figure 9:
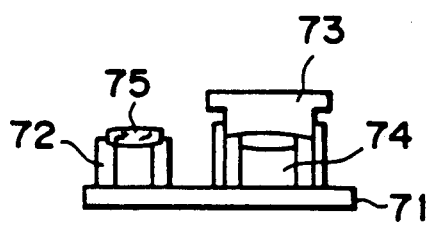

Next, currents are supplied to heaters 97 and 98 to raise the temperature of the inside of the furnace to a predetermined value. After completion of the increase in temperature, in the preform intake chamber 61, the preform is allowed to pass in the atmosphere substituting room. As shown in FIG. 9, the preform 75 is put onto the holder 72 of the pallet 71 in the preform intake chamber 61 by the adsorbing finger 79.

Next, as mentioned above, the extruding cylinders 91, 93, 94, and 95 and the pull-out cylinders 92 and 96 are made operative and each time the pallet 71 is sequentially transported from the molded article fetching room 67 to the preform intake chamber 61, the preform 75 is put onto each holder 72 by the foregoing method.

At the time point when the preform 75 fed to the first pallet 71 and the upper and lower dies 73 and 74 were heated to the temperature necessary for the press-molding near the preform transfer section 63 by repetitively executing the above operations, the preform 75 is transferred to the lower die 74.

At this time, it is desirable to heat the preform 75 and the upper and lower dies 73 and 74 until the almost same temperature. Due to this, it is possible to execute the press-molding under the optimum press temperature conditions without causing a situation such that the temperature of the preform 75 after completion of the transfer is changed depending on the temperature of the upper die 73 or lower die 74.

It has been confirmed that the adhesion between the glass and the holder when the heated glass preform 75 is transferred onto the lower die 74 does not occur. This is because since the holder is made of the ceramics sintered material, the reaction between the holder and lead in the glass was prevented.

In the preform transfer section 63, as shown in FIG. 10, the upper die 73 is lifted up by the lift-up hand 76 and the preform 75 is then adsorbed by the adsorbing finger 64 and is transferred onto the lower die 74. Thereafter, the pallet 71 in which the preform 75 has been transferred is moved to the position of the pressing section 65 by extruding the extruding cylinder 91. At this time, the lift-up hand 76 is removed, the pressing rod 77 is made operative, and the upper die 73 is depressed by a predetermined pressure, thereby executing the press-molding of the preform 75.

Next, the pressure of the pressing rod 77 is eliminated and the upper die 73 is maintained in the state upon pressing. By operating the extruding cylinder 91, the pallet 71 is moved from the pressing section 65 to the position near the outlet of the pressing section 65.

Further, the pallet 71 is pulled out by the pull-out cylinder 92 and is moved to the second transporting chamber 82. After that, the pallet 71 is extruded by the extruding cylinder 93 and is transferred to the third transporting chamber 83 through the transporting passage 85.

Next, the pallet 71 is extruded in the direction of the molded article fetching room 67 by the extrusion of the extruding cylinder 94. However, since the other pallets 71 are arranged in front of the extruding direction, during the continuation of the foregoing operations, the molded article 78 held between the upper and lower dies 73 and 74 passes through the annealing section 66 and is gradually cooled for the time interval when the pallet 71 reaches the position near the outlet of the annealing section 66. The pallet 71 which has arrived at the head position of the annealing section 66 is moved to the molded article fetching room 67 by the pull-out cylinder 96.

Next, the lift-up hand 80 operates and the upper die 73 is removed. The molded article 78 is taken out by the adsorbing finger 79. The pallet 71 from which the molded article was taken out is transferred to the preform intake chamber 61 through the return passage 86 by the extrusion of the extruding cylinder 95.

Since the preform 75 is set on the preform holder 72 and is held in the state in which the preform 75 is separated from the upper and lower dies 73 and 74 until the time point of the transfer of the preform just before the press-molding, the apparatus has a structure such that the reaction between the preform 75 and the upper and lower dies 73 and 74 is prevented as little as possible.

In the press-molding executed as mentioned above, since the die is made of a ceramics sintered material, no reaction occurs between the die material and lead in the glass. Thus, no reactant is produced, no adhesion occurs between the die and the glass, and good molding surfaces were obtained. In addition, the transmittance of the lens obtained is 86% at the d line (587.56 nm) and the good value was obtained.

(2-5) Modification

Figure 13:
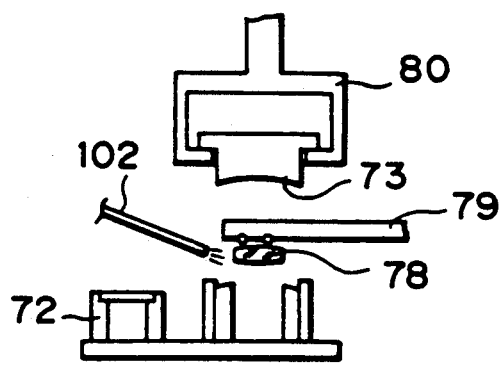
FIG. 13 is an explanatory diagram of another example of the modification.

The second embodiment has been described above with respect to the example in which the adhesion between the glass and the die material is prevented by filling the molding chamber 99 with the (Ar+CH$_4$) mixture gas. However, it is also possible to construct in a manner such that the whole molding chamber is filled with the inert gas such as a nitrogen gas or the like and the (Ar+CH$_4$) mixture gas is adhered onto the molding surfaces of the upper and lower dies or onto the surface of the glass preform in the step just before press-molding. For instance, a nozzle to inject the (Ar+CH$_4$) mixture gas to the glass preform on the glass preform holder is arranged before the pressing section 65 shown in FIG. 7, the mixture gas is adhered onto the glass preform, the glass preform 75 is adsorbed by the adsorbing finger 79 as shown in FIG. 13, and thereafter, the mixture gas is adhered and both surfaces of the glass preform are treated.

According to the invention, it is possible to obtain a manufacturing method whereby even if the die is made of a material such as a tungsten carbide containing metal, as a component, which can easily react to lead in the glass, by using the (Ar+CH$_4$) mixture gas as a molding atmosphere, the production of the reactant which is caused due to the direct reaction between the tungsten carbide and the glass can be prevented and the adhesion when separating the glass molded article from the die is not caused. A fraction defective of the manufactured goods of the molded articles can be remarkably reduced.

On the other hand, the adhesion between the die material and the glass molded article could be also prevented by a method whereby the inert gas such as a nitrogen gas or the like is used as an atmosphere in the molding chamber and the mixture gas is adhered onto the molding surfaces of the upper and lower dies or onto the surface of the glass preform in the step before press-molding.

Further, according to the invention, the occurrence of the excessive contact force between the die and the glass molded article could be also prevented by using the (Ar+CH$_4$) mixture gas as a molding atmosphere gas even in the case of the die made of the ceramics sintered material and having the aspherical molding surface or the die in which ceramics are coated onto the surface of the high temperature and high hardness material.

What is claimed is:

1. A manufacturing method of molding an optical device having an accurate optical surface, comprising the steps of:

preparing a glass preform;

preparing a die member to mold said glass preform into said optical device, said die member having at least an upper die and a lower die for molding said optical surface in order to press-mold the glass preform, and said die member being made of a material resistant to oxidation, and high temperature and having a high hardness property;

individually heating said glass preform and said die member to a temperature necessary to mold;

inserting said glass preform between said upper die and said lower die; and press-molding said glass preform between said upper die and said lower die in an operating atmosphere of a gaseous mixture of a nonoxidizing gas and a hydrocarbon gas, said hydrocarbon gas being present in a concentration of 0.5–4 wt. % of said gaseous mixture.

2. A method according to claim 1, wherein said die member is made of a tungsten carbide material.

3. A method according to claim 2, wherein a film made of a material of selected from the group consisting of a nitride, a carbide, and an oxide is coated onto the surface of the die member which comes into contact with the glass preform.

4. A method according to claim 1, further comprising the steps of:

adhering said gaseous mixture to said glass preform surface and press-molding;

inserting said glass preform between said upper and lower dies.

5. A manufacturing method of molding an optical device having an accurate optical surface, comprising the sequential steps of:
   preparing a pre-molded glass preform;
   preparing a die member to mold said glass preform into the optical device;
   transporting said glass preform and said die member to a heating section and heating to a temperature necessary to mold,
   adhering a gaseous mixture of a nonoxidizing gas and a hydrocarbon gas onto the surface of said glass preform, said hydrocarbon gas being present in a concentration 0.5–4 wt. % of said gaseous mixture.
   transporting said glass preform and said die member to a pressing section for press-molding said glass preform into an optical device; and
   transporting said die member and said optical device to a cooling section for cooling said optical device to a temperature sufficient to separate said mold member from said optical device.

6. A method according to claim 5, wherein said die member is made of a tungsten carbide material.

7. A method according to claim 6, wherein a film made of a material selected from the group consisting of a nitride, a carbide, and an oxide is coated onto the surface of the die member.

8. A manufacturing method of molding an optical device having an accurate optical surface, comprising the steps of:
   preparing a pre-molded glass preform;
   preparing a die member to mold said glass preform into said optical device,
   said die member having at least an upper die and a lower die for molding said optical surface in order to press-mold said glass preform, and said die member being made of a material resistant to oxidation and high temperature, and having a high hardness property;
   simultaneously heating said glass preform and said die member to a temperature necessary to mold;
   inserting said glass preform between said upper die and said lower die; and
   press-molding said glass preform between said upper die and said lower die in an operating atmosphere of a gaseous mixture of a nonoxidizing gas and a hydrocarbon gas, said hydrocarbon gas being present in a concentration of 0.5 to 4 wt. % of said gaseous mixture.

9. A method according to claim 1, including employing a ceramics sintered material die member.

10. A method according to claim 5, including employing a ceramics sintered material die member.

11. A method according to claim 1, including employing a PbO-containing glass preform.

12. A method according to claim 5, including employing a PbO-containing glass preform.

* * * * *

UNITED STATES PATENT AND TRADEMARK OFFICE
CERTIFICATE OF CORRECTION

PATENT NO. : 5,032,159

DATED : July 16, 1991

INVENTOR(S) : Tetsuo Kuwabara et al

It is certified that error appears in the above-identified patent and that said Letters Patent is hereby corrected as shown below:

COLUMN 1

Line 56, "U.S. Pat. Nos. 833347" should read
 --U.S. Pat. Nos. 3,833,347--.
    Line 57, "3900328" should read --3,900,328--.

COLUMN 2

Line 16, "(U.S. Pat. No. 4481023)" should read
--U.S. Pat. No. 4,481,023)--.

COLUMN 3

Line 61, "as" should read --such as--.

COLUMN 5

Line 31, "is" should read --are--.

COLUMN 6

Line 15, "A water" should read --Water--.
    Line 24, "$10^{-2}$. Torr" should read --$10^{-2}$ Torr--.

COLUMN 7

Line 44, "$10^{-2}$. Torr" should read --$10^{-2}$ Torr--.

UNITED STATES PATENT AND TRADEMARK OFFICE
CERTIFICATE OF CORRECTION

PATENT NO. : 5,032,159

DATED : July 16, 1991

INVENTOR(S) : Tetsuo Kuwabara et al

Page 2 of 2

It is certified that error appears in the above-identified patent and that said Letters Patent is hereby corrected as shown below:

COLUMN 9

Line 61, "are oxidized" should read --from being oxidized--.
Line 67, "that" should be deleted.
Line 68, "entering" should read --from entering--.

COLUMN 10

Line 15, "result is" should read --results are--.
Line 24, "$10^{-2}$. Torr" should read --$10^{-2}$ Torr--.
Line 50, "the almost" should read --almost the--.

COLUMN 12

Line 12, "A fraction defective" should read --The defective portion--.
Line 59, "of" (second occurrence) should be deleted.

Signed and Sealed this

Second Day of March, 1993

Attest:

STEPHEN G. KUNIN

*Attesting Officer*     *Acting Commissioner of Patents and Trademarks*